United States Patent
Howard

(10) Patent No.: US 10,006,645 B1
(45) Date of Patent: Jun. 26, 2018

(54) GREYWATER HEAT RECOVERY WITH WARM SIDE AGITATION

(71) Applicant: Paul Howard, Reston, VA (US)

(72) Inventor: Paul Howard, Reston, VA (US)

(73) Assignee: Paul A. Howard, Reston, VA (US)

( * ) Notice: Subject to any disclaimer, the term of this patent is extended or adjusted under 35 U.S.C. 154(b) by 0 days. days.

(21) Appl. No.: 15/462,298

(22) Filed: Mar. 17, 2017

Related U.S. Application Data

(60) Provisional application No. 62/451,125, filed on Jan. 27, 2017.

(51) Int. Cl.
- *F24D 17/00* (2006.01)
- *E03C 1/00* (2006.01)
- *A47K 3/40* (2006.01)

(52) U.S. Cl.
CPC ............ *F24D 17/0005* (2013.01); *E03C 1/00* (2013.01); *E03C 2001/005* (2013.01)

(58) Field of Classification Search
CPC ............... F24D 17/0005; F24D 17/001; E03C 2001/005; A47K 3/40
See application file for complete search history.

(56) References Cited

U.S. PATENT DOCUMENTS

| | | | | |
|---|---|---|---|---|
| 4,291,423 A * | 9/1981 | Wilson | ...................... | E03C 1/00 4/545 |
| 4,304,292 A * | 12/1981 | Cardone | ............... | F24D 17/001 165/156 |
| 4,542,546 A * | 9/1985 | Desgagnes | ................ | E03C 1/12 165/66 |
| 4,619,311 A * | 10/1986 | Vasile | .................. | F24D 17/0057 165/47 |
| 5,143,149 A * | 9/1992 | Kronberg | ............ | F24D 17/0005 165/163 |
| 5,736,059 A * | 4/1998 | Mackelvie | ............ | F24D 17/001 165/47 |
| 2002/0162650 A1 * | 11/2002 | MacKelvie | ......... | F24D 17/0005 165/154 |
| 2007/0089230 A1 * | 4/2007 | Hendricks | .......... | A61H 33/6068 4/596 |
| 2011/0107512 A1 * | 5/2011 | Gilbert | ...................... | E03C 1/00 4/596 |
| 2013/0269917 A1 * | 10/2013 | Garcia Melico | .... | F24D 17/0005 165/163 |
| 2014/0237714 A1 * | 8/2014 | Rusch | ...................... | A47K 3/40 4/598 |
| 2014/0290924 A1 * | 10/2014 | Gilbert | ...................... | F28D 7/04 165/177 |
| 2014/0311709 A1 * | 10/2014 | Chan | ................... | F28D 1/05316 165/104.11 |
| 2017/0121951 A1 * | 5/2017 | Holm | ........................ | E03C 1/00 |
| 2017/0198982 A1 * | 7/2017 | Tornquist | ............ | F28D 21/0012 |

* cited by examiner

*Primary Examiner* — Janie Loeppke

(57) ABSTRACT

This heat recovery device replaces the floor drain in a common residential shower. A large circular pan joins flush with the shower stall floor and funnels greywater into the drain piping. The circular pan contains the heat transfer device which preheats the incoming cold water and recovers approximately half of the heat that would otherwise be lost. The incoming cold water travels through a water turbine where it rotates an impeller. The impeller is magnetically coupled with a rotary whisk. The rotary motion continuously washes the draining greywater over a spiral warming coil. The spiral coil transfers the heat to the incoming fresh water as it travels to the shower's mixing valve.

19 Claims, 5 Drawing Sheets

GREYWATER HEAT RECOVERY WITH WARM SIDE AGITATION

CROSS-REFERENCE TO RELATED APPLICATIONS

This applicant claims the benefit of Provisional Patent Application No. 62/451,125, filed Jan. 27, 2017 by the present inventor.

STATEMENT REGARDING FEDERALLY SPONSORED RESEARCH OR DEVELOPMENT

There has been no federal funding for this project.

REFERENCE TO SEQUENCE LISTING, A TABLE, OR A COMPUTER PROGRAM LISTING COMPACT DISC APPENDIX

Not applicable.

BACKGROUND OF THE INVENTION

Field of Invention

This invention relates to greywater heat recovery and energy savings. The preferred embodiment is a typical residential shower stall where heat from draining greywater preheats the incoming fresh water. Another application is in commercial health clubs where high usage showers offer even greater energy savings. Other high usage applications might be educational or organized sports facilities.

According to the EPA, an average shower lasts 7 minutes and has a flow rate of 9.5 L/minute (2.5 gallons/minute). Hot and fresh water are mixed by the bather to a comfortable temperature of about 41.7° C. (107° F.). Water typically enters a house at 12.8° C. (55° F.) but can be colder in the winter. The energy to warm the incoming water is supplied by the hot water heater. The power represented by the draining water is 18 kilowatts. Consequently, it is not possible for a single hot water heater to keep up with repeated showers. Presently the energy in that draining water is lost. It is the purpose of this invention to capture at least half of that heat and preheat the fresh water before it flows to the shower's mixing valve.

Description of Prior Art

There have been many attempts to recover the lost energy in greywater. Engineers and inventors recognize the large potential energy savings. Prior inventions are not widely used because they do not capture enough heat to be practical. To do this, the recovery device must simultaneously overcome the limitations of small temperature differences, surface area and time. Small temperature differences require a countercurrent design. However prior attempts have not increased surface area since gravity limits the area to vertical flow paths. Additionally, heat transfer rates are not addressed with external forced convection. Furthermore, the greywater is not detained in the device long enough for heat transfer.

Prior art greywater heat recovery inventions have other limitations. To be practical, the invention must be easily integrated into present designs. Therefore the device should be collocated in the shower stall and be compatible with existing building codes. The household water supply cannot be contaminated with greywater. Furthermore, the device must be easy to maintain by the occupant.

U.S. Pat. No. 4,542,546 utilizes a drain tank to extend the exposure time of greywater to the incoming water. However the tank loses heat between uses and the countercurrent nature is not fully utilized because there is little temperature differential between incoming and the larger volume of water in the holding tank.

U.S. Pat. Nos. 4,619,311 and 5,143,149 use a remote heat exchanger to transfer heat from the draining water. In these designs, heat is lost before the draining water reaches the heat exchanger. Additionally, the heat exchange is not enhanced by forced convection.

U.S. Pat. No. 5,736,059 utilizes a remote common heat exchanger to extract heat from waste water. Heat losses prior to arriving at the heat exchanger are present. The system design is more appropriate for larger and multiple greywater sources.

USPTO 2007/0089230 recognizes the problem of waste heat from a residential shower. His device detains the waste water, captures some of the heat and slowly releases that heat into the house. However, this device does not use that heat immediately but rather releases the heat slowly into the shower stall. Additionally his device should not be used during the cooling season since then it burdened the air conditioning system.

US 2014/0237714 utilizes the shower stall floor as a heat exchanger surface. This arrangement limits the countercurrent flow pattern. Additionally, the ability to clean and maintain the active surface is difficult.

Existing heat exchangers are difficult to clean and decalcify and/or are difficult to control and service. Most importantly, the primary function is heat transfer which can be greatly increased by enhancing the greywater side heat transfer coefficient.

BRIEF SUMMARY OF THE INVENTION

The invention disclosed here presents a unique and superior solution to this heat transfer problem. Greywater heat must be convected to the tube surface. This heat must then be conducted through the tube wall and finally convected to the fresh water. Each step requires a temperature difference. The sum of these temperature differences equals the difference between the warm greywater and fresh incoming water. However, the greywater convection is poor and most of the temperature difference is consumed there. This limits the heat transfer to the fresh water. The agitation employed in this invention solves this problem. Now the greywater to tube heat transfer is improved by at least a factor of ten.

Accordingly, it is the object of the present invention to improve waste heat recovery by increasing the surface area and time for energy transfer. Additionally and most importantly, the present invention enhances heat transfer by forcefully agitating the greywater and its contact with the fresh water supply tube. Furthermore, this improved device utilizes the warmest waste water and coldest inlet water to maximize the energy recovery. Fresh inlet water is detoured to the recovery device, absorbs heat and continues to the mixing valve. The recovery device is located and replaces the traditional floor drain. The recovery device is compatible with existing designs and practices. The thermal response of the device is short so it delivers pre-warmed water quickly.

REFERENCE NUMERALS

32 Drain Water Piping
36 Hot Water Supply
38 Temperature Control Valve
40 Typical residential shower stall
42 Greywater Heat Recovery Device
44 Tread Plate
48 Spiral-warming Coil
46 Drain Pan
50 Trim Edge
52 Drain Slots
54 Rotary Agitator Assembly
56 Incoming Fresh Water
58 Pre-warmed Water
60 Conical Pan
62 Water Turbine
64 Conical Pan Drain Holes
66 Lower Housing
68 Impeller
70 Permanent Magnets
72 Turbine Exit
74 Upper Housing
76 Screws
78 O-Ring Seals
80 Rotary Cap
81 Indented Area
82 Whisk
84 Internal Gear Teeth
86 Idler Gears
88 Gear Carrier
90 Rotary Drive Spider
92 Drive Step
94 Planetary Assembly

DETAILED REVIEW OF DRAWINGS

Figure 1:
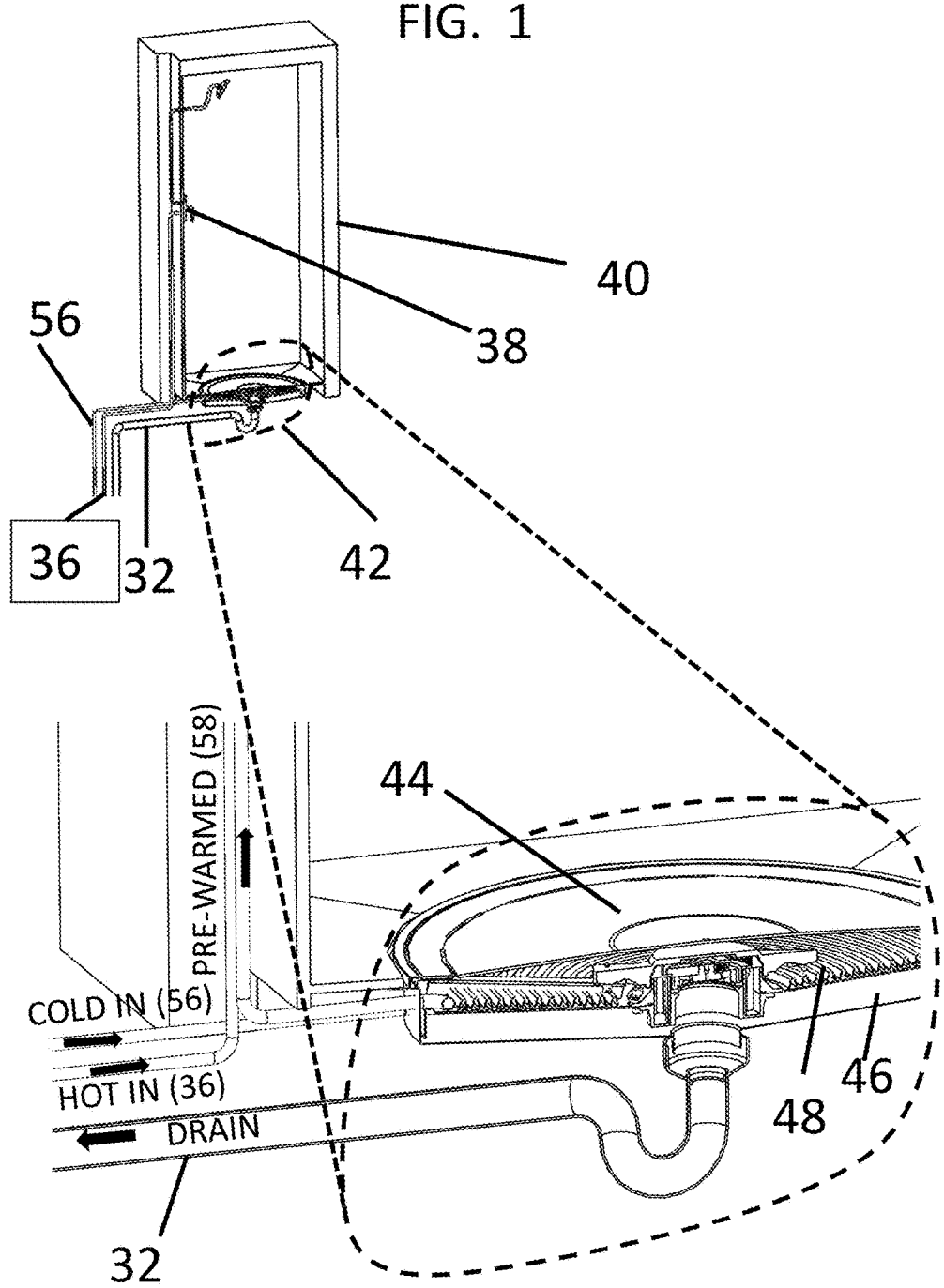
FIG. 1 shows the improved heat recovery device in a typical residential shower stall

FIG. 1 shows the preferred embodiment installed in a typical residential shower stall (40). The hot water supply (36) is connected directly to the temperature control valve (38). The bather uses this valve to obtain the desired water temperature. The incoming fresh water (56) is connected to the heat recovery device. Then pre-warmed water (58) leaves the heat recovery device and connects to the temperature control valve. The greywater heat recovery device (42) is positioned in the floor. The greywater exits though the same drain water piping (32) as a traditional drain. Thus, it can be substituted for a traditional drain in new construction or selected in the case of remodeling. The bather will stand on the tread plate (44). Falling water strikes the shower stall floor or tread plate and enters the recovery device. The largest part of the recovery device is the drain pan (46). The drain pan has an outer flange to join with the floor tile. The drain pan (46) collects all greywater and funnels it to the drain water piping (32). Said pan has a conical shape with a downward pitch of approximately 4°. Drain water is detained within the recovery device to allow sufficient time to transfer heat to the incoming fresh water. The spiral-warming coil (48) is formed into a slightly rounded triangle to provide more turns of the spiral and more surface area than a simple round tube.

Figure 2:
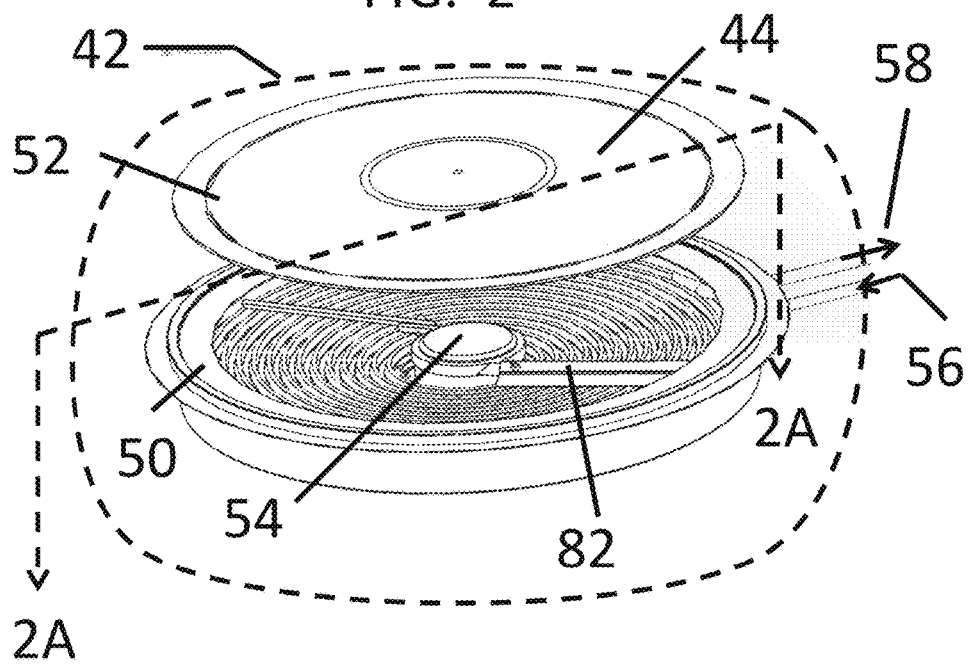
FIG. 2 shows the improved heat recovery device in an exploded view

FIG. 2 shows an exploded view of the greywater heat recovery device (42) with its tread plate (44) elevated to expose the interior. The tread plate is slightly raised in the center to direct the draining water outward. The tread plate can be easily removed for cleaning. The tread plate is supported concentrically at its outer peripheral by the trim edge (50). The trim edge butts against the floor tile and is the exposed outer edge of the recovery device. Drain slots (52) direct greywater to the outer ring of the spiral-warming coil. The drain slots (52) are at the lowest point in the tread plate to insure that all greywater enters near the outer ring of the spiral-warming coil. The concentrically located rotary agitation assembly (54) can be easily removed for rodding or clearing a clogged drain pipe. The agitator rotates in the opposite direction as the fresh water in the spiral-warming tube. The rotary agitation assembly (54) agitates the greywater and increases the heat transfer as it moves toward the drain. The incoming fresh water (56) enters the recovery device. This same flow leaves as pre-warmed water (58) in its journey to the temperature control valve (38).

Figure 2A:
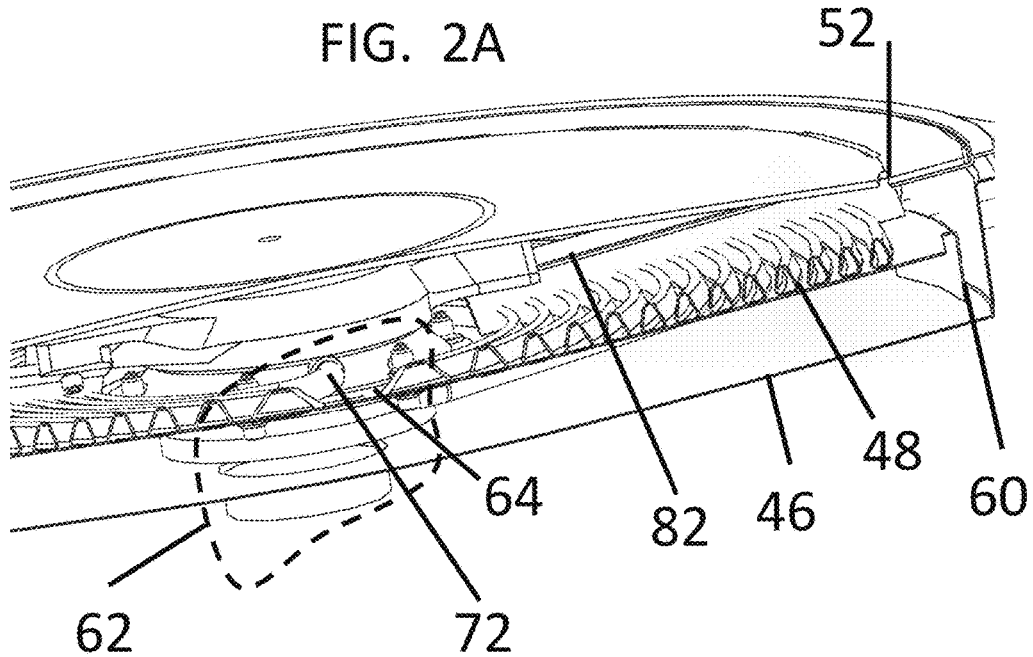
FIG. 2A shows the improved heat recovery device in a sectional view

Sectional view FIG. 2A reveals more detail. The drain pan (46) collects all water and funnels it into the drain water piping. The conical pan (60) has an outer downward facing flange that sits on the drain pan. The conical pan has a 4° downward pitch and supports the spiral-warming coil (48). The spiral-warming coil is bonded to the conical pan creating an open spiral flow channel. The greywater must travel a lengthy route to the drain that increases the time for heat transfer. The conical pan has a ring of horizontal tabs near the center that support the water turbine (62). Thus, there is a clear and open path for water to flow to the drain. Greywater travels toward the water turbine and then flows downward through the conical pan drain holes (64) to the drain pan. FIG. 2 also shows the water turbine supporting the rotary agitation assembly (54) which has a symmetric array of whisks (82). Removing the agitation device exposes the central opening into the drain piping for maintenance.

Figure 3:
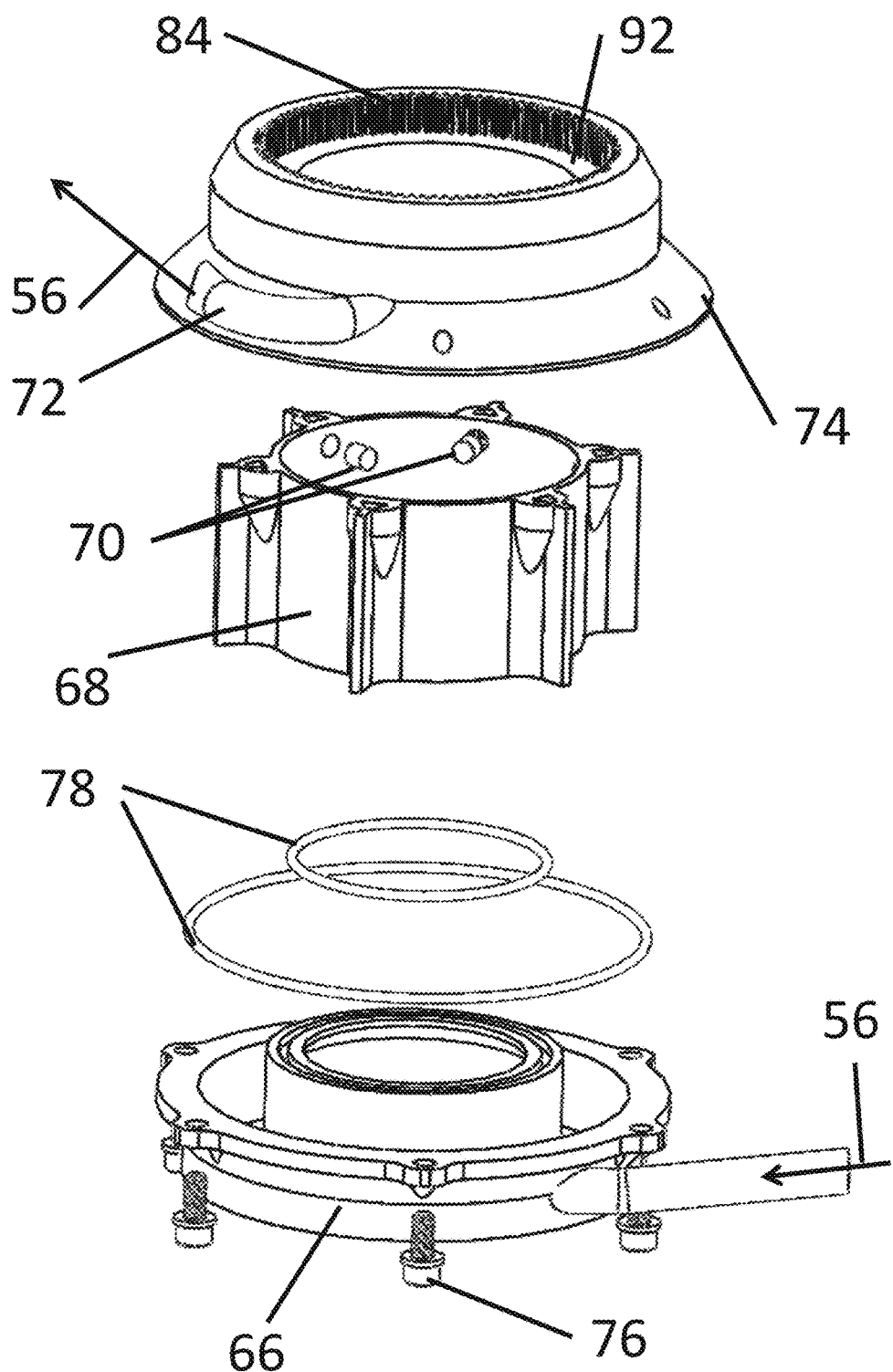
FIG. 3 shows an exploded view of the water turbine

FIG. 3 shows an exploded view of the centrally located water turbine (62). The water turbine is a sealed unit and pressurized with incoming fresh water (56). Incoming fresh water enters tangentially on the outer circumference of the lower housing (66). The water flow rotates the impeller (68). The impeller has permanent magnets (70). Six magnets are shown as representative. An alternate embodiment locates the magnets radially outward to couple directly with the whisk assembly. A still farther embodiment locates the magnets to couple with the cap in a vertical direction. There are many useful and effective ways to orientate the magnets or to enhance with iron slugs. The important feature revealed here is that the turbine does not have a drive shaft or penetration in the housing. Magnetic coupling transmits the motive force. Fresh water flows through the turbine exit (72) (also visible in FIG. 2) located in upper housing (74). Also shown in FIG. 3 is a drive step (92) which would support the planetary drive. The planetary drive engages with internal gear teeth (84).

Screws (76) join the upper and lower housings. O-rings (78) or other suitable gaskets create a watertight seal. It is essential that the greywater cannot contaminate the household water supply.

The impeller (68) has flexible blades. It is necessary that the turbine rotate in proper direction. Flow begins when the bather adjusts the temperature control valve. Demand for fresh water will lower the pressure at the turbine exit (72). The differential pressure on opposite sides of the blades guarantee that the turbine starts and rotates in the proper direction.

Figure 4A:
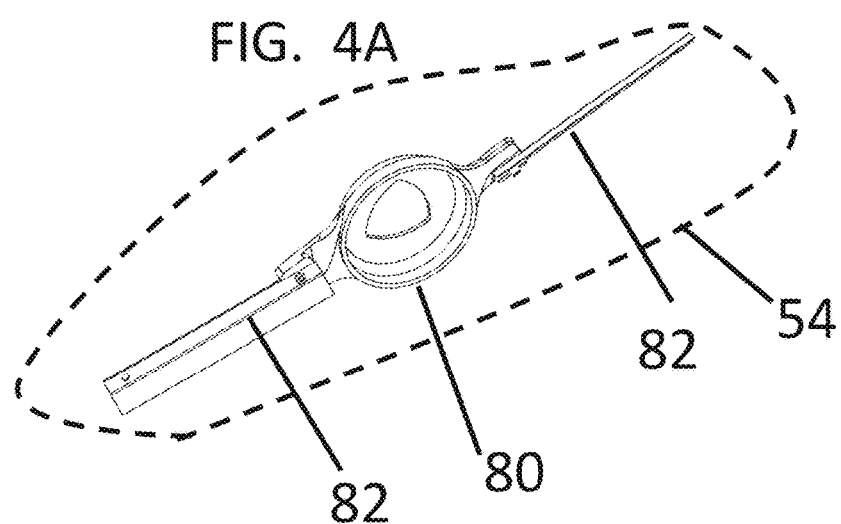
FIGS. 4A & 4B show two views of the agitation whisk assembly

FIG. 4A shows the underside of the rotary agitator assembly (54). The main component of this assembly is the rotary cap (80). At least two whisks (82) are attached to the rotary cap. The whisks are orientated to brush and wet the spiral-warming coil. The bristle density can be adjusted to sweep approximately half of the greywater it touches. Increasing the bristle density will shorten the time required to move all the greywater from the spiral-warming tube. The rotary action enhances heat transfer and aids the gravity flow of the greywater. The bristles wash the outer surface of the spiral-warming tube. The agitator rotates counter currently to the incoming fresh water (56). The warmest greywater is near the outer and highest edge of the conical pan (60). As the greywater travels down, it releases its heat to the incoming water (56). Likewise, near the bottom of the conical pan, the greywater has given up most of its heat but the incoming water is coldest. This countercurrent flow scheme is essential in a low temperature differential system such as this. The entire length of the spiral-warming tube is active.

Figure 4B:
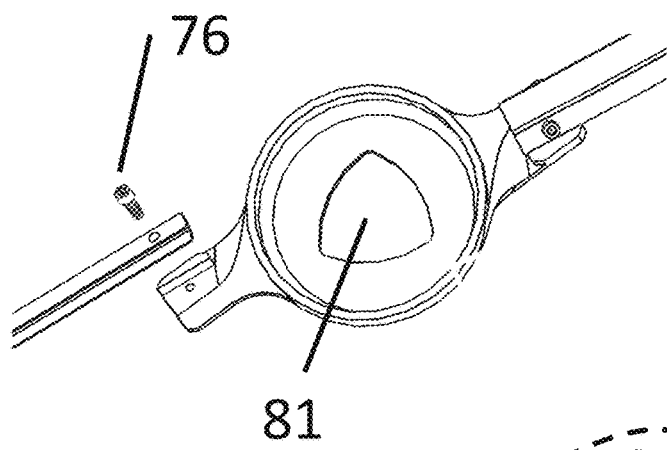
Figure 5:
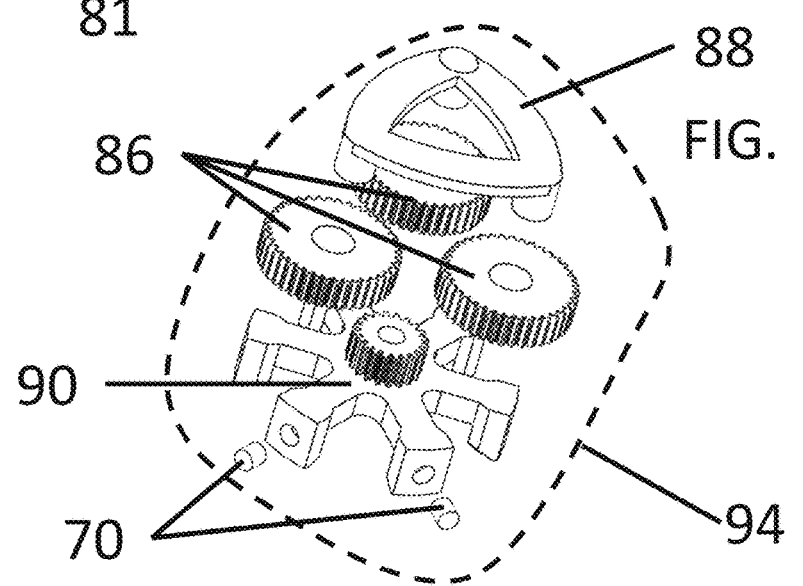
FIG. 5 shows an exploded view of the planetary assembly

FIG. 4B shows the rotary agitator assembly with its key parts exploded. The rotary cap has an indented area (81) to engage with the gear carrier (88). FIG. 5 shows an exploded view of the planetary assembly (94). The gear carrier positions the idler gears (86). In this embodiment, the idler gears engage the internal gear teeth (84) in the upper turbine housing. The gear carrier and idler gears then rest on the rotary drive spider (90). The rotary drive spider sits on top of the drive step (92) machined into the upper housing (74). This planetary gear arrangement increases the torque provided by the rotary drive spider and allows the water turbine to be smaller.

The rotary drive spider (90) has permanent magnets (70) located radially and on the outer edge. They are positioned to magnetically couple with the permanent magnets on the impeller. The magnetic coupling of the impeller and rotary drive allow the sealed turbine to power the rotary agitator. The upper housing is thin where the magnets couple. The housing is made of a material that is not ferromagnetic. The rotary cap with whisks and the planetary assembly (94) can be easily removed for cleaning or maintenance.

Figure 6:
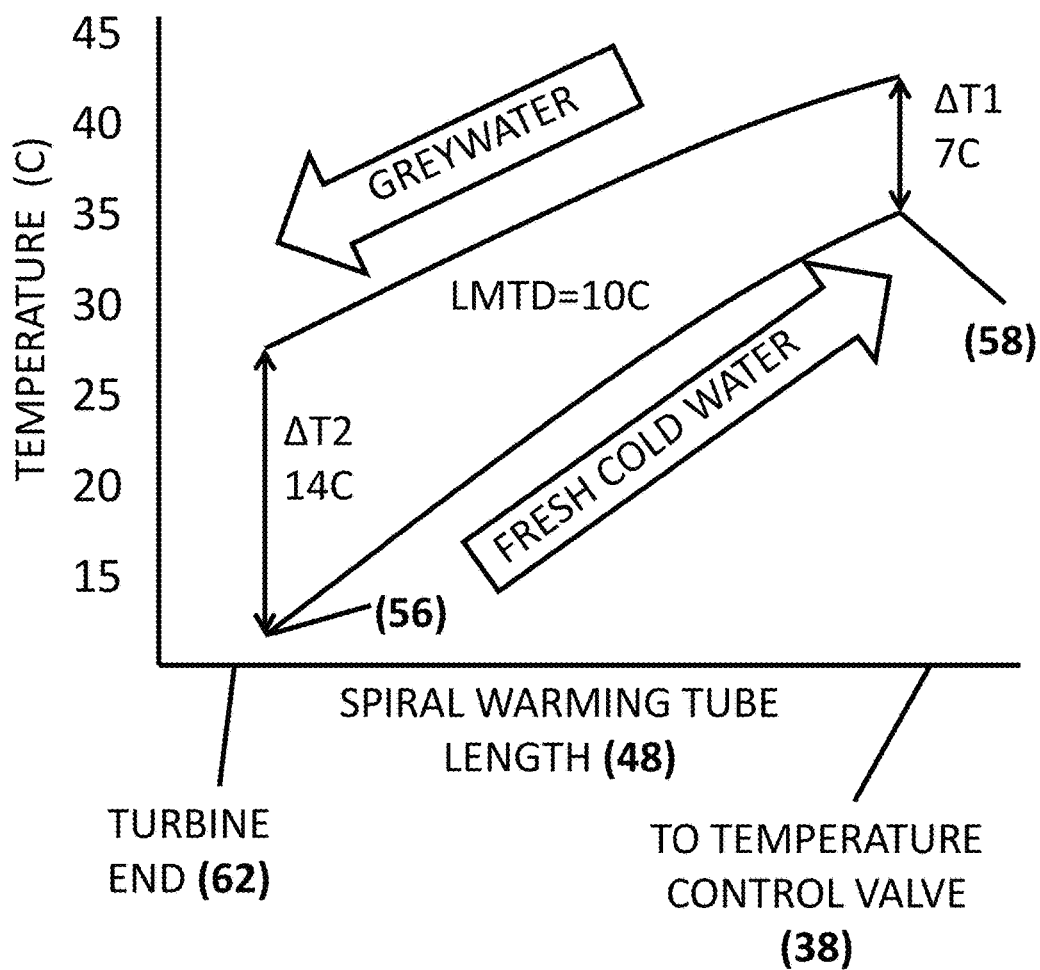
FIG. 6 shows countercurrent temperature profiles in the heat recovery device

FIG. 6 shows the temperature profiles for the greywater and fresh water. The example shown here is for a typical residential shower that recovers about half of the waste heat. The greywater enters the heat recovery device at 41.7° C. (107° F.) and exits at 26.7° C. (80° F.); the greywater cools by 15° C. (27° F.). The fresh water (56) enters at 12.8° C. (55 F.°) and exits at 34.4° C. (94° F.) as pre-warmed water (58); the water heats by 21.7° C. (39° F.). The greywater has a higher flow rate than the fresh water and therefore has a smaller temperature change. It can be seen from FIG. 6 that the temperature difference between grey and fresh water varies. In a counter current system such as this, the effective temperature difference is the LMTD (Logarithm Mean Temperature Differential) and specifically here it is 10° C. (18° F.). The wetted surface (heat transfer area) of the greywater side is slightly larger than the fresh water side. However the temperature difference is shared about equally by warm and cold side so about 5° C. (9° F.) each.

The heat transfer coefficient is large inside the spiral-warming coil (48) because the flow is highly turbulent. Likewise, the exterior has excellent heat transfer because the whisk (82) continuously washes the exterior of the spiral-warming coil with greywater. In the preferred embodiment, the impeller is sized to rotate at 30 rpm when the cold flow is 1.6 gpm. The wiping motion of the whisk is approximately equal to the fresh water velocity. The results shown in FIG. 6 are for a spiral-warming coil (48) that is 18 m (60 feet) long. The round ½" copper tube is formed to be roughly a triangle. The formed triangle is 14 mm (0.55") high and 10 mm (0.4") wide. The forming allows 25% greater surface area with additional spiral turns in the warming coil.

Operation

A comfortable shower temperature is 41.7° C. (107° F.). Typical hot and cold household water temperatures are 60° C. (140° F.) and 12.8° F. (55° F.). The required blend of hot and cold water is 5.7 and 3.8 L/min (1.5 and 1.0 gallons/minute) respectively. Preheating the cold water will begin as soon as the drain water is warmer than 12.8° F. (55° F.). The volume of the cold water inside the heat recovery device is 1.8 L (0.46 gallons). So it will take no longer than half a minute to completely flush out the cold water. After the temperatures stabilize, the blend will be 3.2 and 6.3 L/min (0.85 and 1.65 gallons/minute) hot and cold respectively. A residential temperature control valve (38) can automatically blend the hot and cold flow to provide a selected shower water temperature.

The drain slots (52) are located in the lowest part of the tread plate (44). All the greywater falls on the outer ring of the spiral-warming coil. In the illustration shown here, the spiral-warming coil has 15 turns. If the bristle density of the whisk is such that half of the greywater is swept with one stroke, the response time the heat exchanger will be about 30 seconds.

Ideally, the travel time of the greywater is nearly equal to the fresh water. Adjusting the bristle density and number of whisks can equalize the time.

In a shower stall without a heat recovery device, water strikes the shower stall floor and flows downward and radially inward to the drain. With the heat recovery device, the water flows through drain slots (52) distant from the center. Then the water falls to the outer edge of the spiral-warming coil. At this point, the water begins a lengthy (about sixty feet) journey down and to the center. The rotary whisk assists the gravity flow. During its travel, the water is exposed to an ever increasingly cold spiral-warming coil. This is a consequence of the counter current flow. When the water has given up as much heat as possible, it falls to the drain pan. The drain pan funnels the flow to the drain piping.

The invention claimed is:

1. A cone-shaped shower stall drain with heat exchanger comprising:
    a helicoid tube, a funnel shaped pan, a rotary agitation assembly, and a reaction turbine;
    a first active heat transfer surface defined by an exterior surface of the helicoid tube and an exposed surface of the funnel shaped pan to which the helicoid tube is bonded;
    a second active heat transfer surface defined by an interior surface of the helicoid tube;
    wherein the rotary agitation assembly comprises at least one whisk blade having whisk bristles, the rotary agitation assembly being coaxial with the funnel shaped pan, and the whisk bristles being configured to sweep the exterior active heat transfer surface;
    wherein the reaction turbine is coaxial with the funnel shaped pan; and
    the reaction turbine farther comprising a turbine impeller magnetically coupled to the rotary agitation assembly.

2. The cone-shaped shower stall drain assembly according to claim 1 wherein heat from gravity flowing greywater is transferred to the exterior active heat transfer surface and a pressurized fresh water flowing inside the helicoid tube.

3. The cone-shaped shower stall drain assembly according to claim 2, wherein the bonding of the helicoid tube and funnel shaped pan creates a spiral open flow channel for the gravity flowing greywater.

4. The cone-shaped shower stall drain assembly according to claim 2, wherein the gravity flowing greywater has a flow path in an opposite direction as the fresh water flow path.

5. The cone-shaped shower stall drain assembly according to claim 2, wherein the rotary agitation assembly agitates the greywater, thereby increasing heat transfer from the greywater to the first active heat transfer surface.

6. The cone-shaped shower stall drain assembly according to claim 2, wherein the rotary agitation assembly assists the flow of the greywater.

7. The cone-shaped shower stall drain assembly according to claim 2, wherein the pressurized fresh water flow rotates the turbine impeller.

8. The cone-shaped shower stall drain assembly according to claim 1, wherein the reaction turbine is without driveshaft penetrations.

9. The cone-shaped shower stall drain assembly according to claim 1, wherein the magnetic coupling is axial or radial.

10. A greywater heat recovery device utilizing a water-powered turbine for driving a rotary whisk that improves forced convection heat transfer on the outer surface of a spiral-shaped warming tube comprising:
   at least one whisk having a circular motion path for agitating draining greywater over a spiral-shaped warming tube;
   wherein the spiral-shaped warming tubes contains cold water that receives heat from the draining greywater;
   wherein the whisk assists in the gravity flow of the greywater;
   wherein the cold water flows in the opposite direction as the draining greywater;
   wherein the whisk rotates in a direction opposite the cold water flow;
   wherein the cold water flow rotates an impeller within the water-powered turbine; and
   wherein the impeller is magnetically coupled to the whisk.

11. The greywater heat recovery device according to claim 10, wherein an interior of the water turbine is sealed from the draining greywater.

12. The greywater heat recovery device according to claim 10, wherein the spiral-shaped warming tube creates an open flow channel for detaining the draining greywater.

13. The greywater heat recovery device according to claim 10, wherein the whisk is removable for maintenance.

14. The greywater heat recovery device according to claim 10, wherein the whisk is coupled to the impeller with magnets oriented in an inward radial direction.

15. The greywater heat recovery device according to claim 10, wherein the whisk is coupled to the impeller with magnets oriented in a axial direction.

16. The greywater heat recovery device according to claim 10, wherein the whisk is driven indirectly by a gear which is magnetically coupled to the impeller.

17. The greywater heat recovery device according to claim 10, wherein the device is coupled to existing drain piping.

18. The greywater heat recovery device according to claim 10, wherein the device is installed beneath a shower stall floor.

19. The greywater heat recovery device according to claim 17, further comprising at least one conical pan capturing the draining greywater, supporting the spiral-shaped warming tube and, directing the draining greywater spirally towards a center of the greywater heat recovery device and the drain piping.

* * * * *